G. D. BROOKS.
Sheet-Metal Can.
No. 207,007.  Patented Aug. 13, 1878.
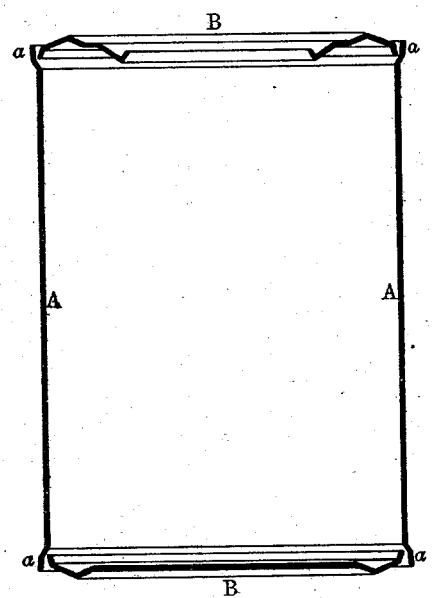
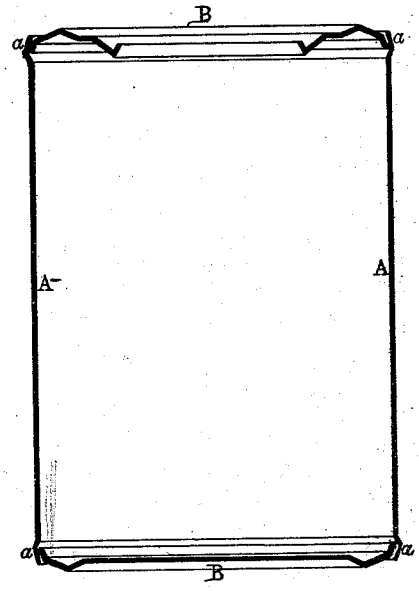

UNITED STATES PATENT OFFICE.

GEORGE D. BROOKS, OF BALTIMORE, MARYLAND, ASSIGNOR, BY MESNE ASSIGNMENT, TO ROBERT T. SMITH AND WILLIAM A. WICKS, OF SAME PLACE.

IMPROVEMENT IN SHEET-METAL CANS.

Specification forming part of Letters Patent No. 207,007, dated August 13, 1878; application filed February 1, 1878.

*To all whom it may concern:*

Be it known that I, GEORGE D. BROOKS, of the city of Baltimore and State of Maryland, have invented certain Improvements in Sheet-Metal Cans, of which the following is a specification; and I do hereby declare that in the same is contained a full, clear, and exact description of my said invention, reference being had to the accompanying drawing, and to the letters of reference marked thereon.

The invention consists in a cylindrical can-body having each of its ends expanded or shaped into an angular bead, combined with heads having their edges flanged or flared outwardly to a size of about equal diameter with the center or vertex of the said angular beads, the downward flange of each head resting in an expanded end of the can, which, when the can is sealed, is bent over and against the flange of the head from the center or vertex of the bead, as hereinafter described.

In the further description of the invention which follows, reference is made to the accompanying drawing, forming a part hereof, and in which—

Figure 1 is a vertical section of the case with the heads inserted therein previous to the contraction of the expanded edges of the can-body. Fig. 2 is a similar section of the completed can.

Similar letters of reference indicate similar parts in both figures.

A is the body of the can, having the angularly-beaded or radially-distended ends *a*. B B are the flanged heads of the can, adapted for insertion in the distended ends of the body, as shown in Fig. 1 of the drawing. Previous to the soldering of the heads to the body the distended edges of the body are contracted by means of suitable machinery, so as to present the appearance shown in Fig. 2 of the drawing.

The advantages of contracting the edges of the can-body over and upon the heads, as described and shown, consist in that the heads are securely held in place during the soldering operation, and the joints are so thoroughly closed that no admission of solder to the interior of the can can possibly take place, thus preventing injury to the contents from contact with solder, two-thirds of which is usually lead.

A further advantage consists in that less solder is required to effect water and air tight joints, there being, practically, no space between the flanges of the heads and the body to be closed by the melted solder.

Having thus described my invention, what I claim as new, and wish to secure by Letters Patent of the United States, is—

The can-body A, having the angularly-beaded ends *a*, combined with the heads B, having their edges bent downward at an obtuse angle, each of said heads being placed in an angular bead of the body, and secured therein by the overlapping of that portion of the bead beyond the vertex of the angle forming the bead, substantially as herein specified.

In testimony whereof I have hereunto subscribed my name this 12th day of January, in the year of our Lord 1878.

GEO. D. BROOKS.

Witnesses:
WM. T. HOWARD,
THOS. MURDOCH,